United States Patent [19]
MacDonnell

[11] 3,830,042
[45] Aug. 20, 1974

[54] RECTANGULAR FILTER BAG

[75] Inventor: Robert W. MacDonnell, Crete, Ill.

[73] Assignee: Allied Filter Engineering, Inc., Chicago, Ill.

[22] Filed: Sept. 13, 1972

[21] Appl. No.: 288,528

[52] U.S. Cl............ 55/341, 55/373, 55/379, 55/381, 55/480, 55/484, 55/492, 55/497, 55/DIG. 26
[51] Int. Cl............................................ B01d 46/02
[58] Field of Search ............ 55/341, 495, 342, 497, 55/490, 502, 482, 503, 483, 508, 484, 521, 486, 379, 489, 378, 492, 380, 488, 381, 373

[56] References Cited
UNITED STATES PATENTS

| | | | |
|---|---|---|---|
| 2,079,413 | 5/1937 | Kress | 55/382 X |
| 2,906,371 | 9/1959 | Jones | 55/381 X |
| 2,964,127 | 12/1960 | Korn | 55/382 X |
| 3,276,190 | 10/1966 | Babbitt et al. | 55/341 |
| 3,289,395 | 12/1966 | Getzin | 55/341 |
| 3,385,033 | 5/1968 | Basore | 55/341 X |
| 3,400,519 | 9/1968 | Korn | 55/484 |
| 3,422,602 | 1/1969 | Janson | 55/484 X |
| 3,470,680 | 10/1969 | Avera | 55/497 |
| 3,478,498 | 11/1969 | Sauerman | 55/502 X |
| 3,524,304 | 8/1970 | Wittemeier et al. | 55/483 X |
| 3,606,740 | 9/1971 | Ballennie | 55/502 X |
| 3,679,537 | 7/1972 | Huer | 55/521 X |
| 3,691,736 | 9/1972 | Neumann | 55/484 |

Primary Examiner—Frank W. Lutter
Assistant Examiner—Neil F. Greenblum
Attorney, Agent, or Firm—Hume, Clement, Brinks, Willian, Olds & Cook, Ltd.

[57] ABSTRACT

A disposable filter bag for the intake air housing of a locomotive has a generally rectangular box-shaped extended configuration and is of pliable sheet stock of full flow depth filter material to be collapsible for folding into compact form. The bag is mounted between external and internal cage-like frames that stabilize the extended configuration of the bag.

7 Claims, 6 Drawing Figures

PATENTED AUG 20 1974
3,830,042
SHEET 1 OF 2
FIG. 1
FIG. 2
PRIOR ART
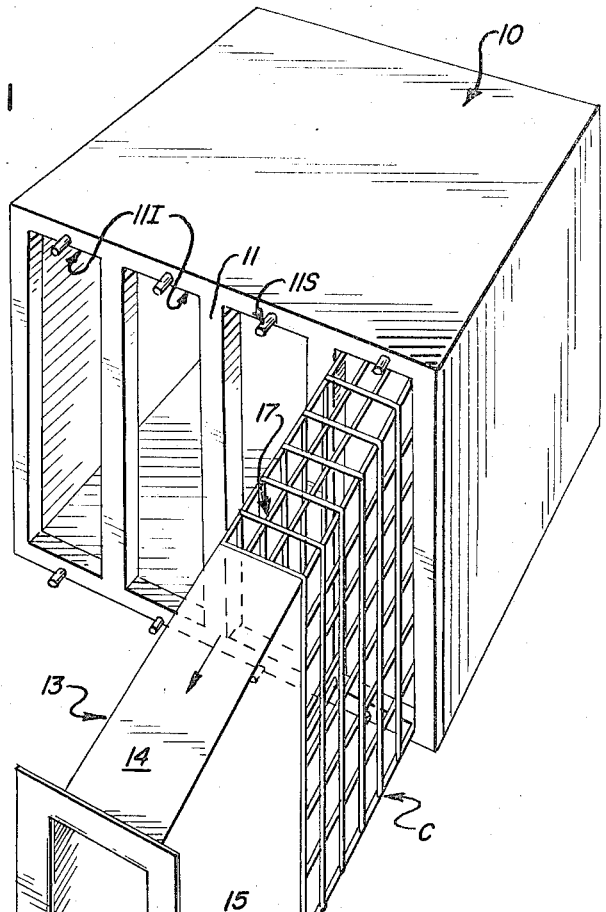
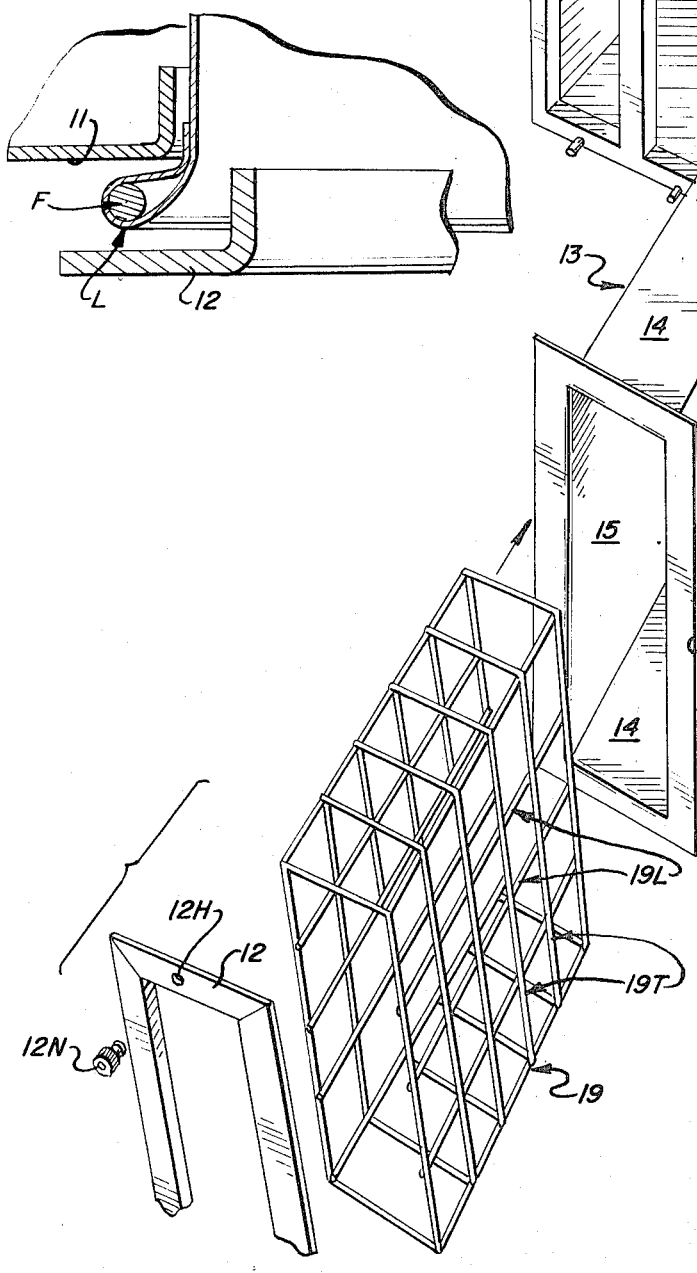

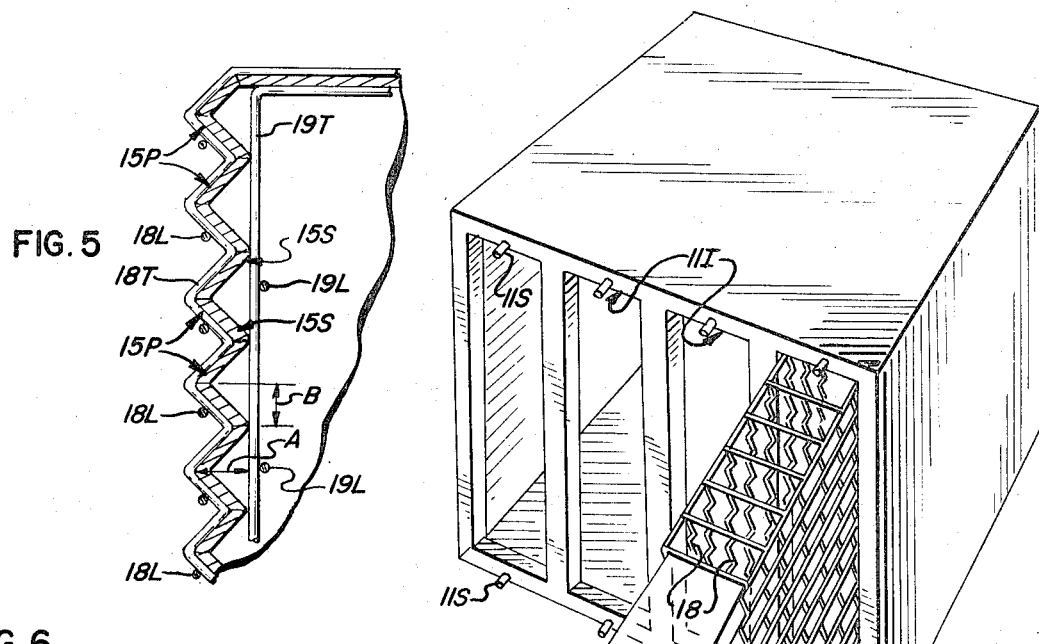
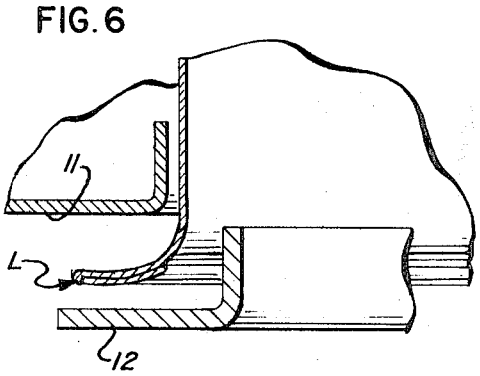
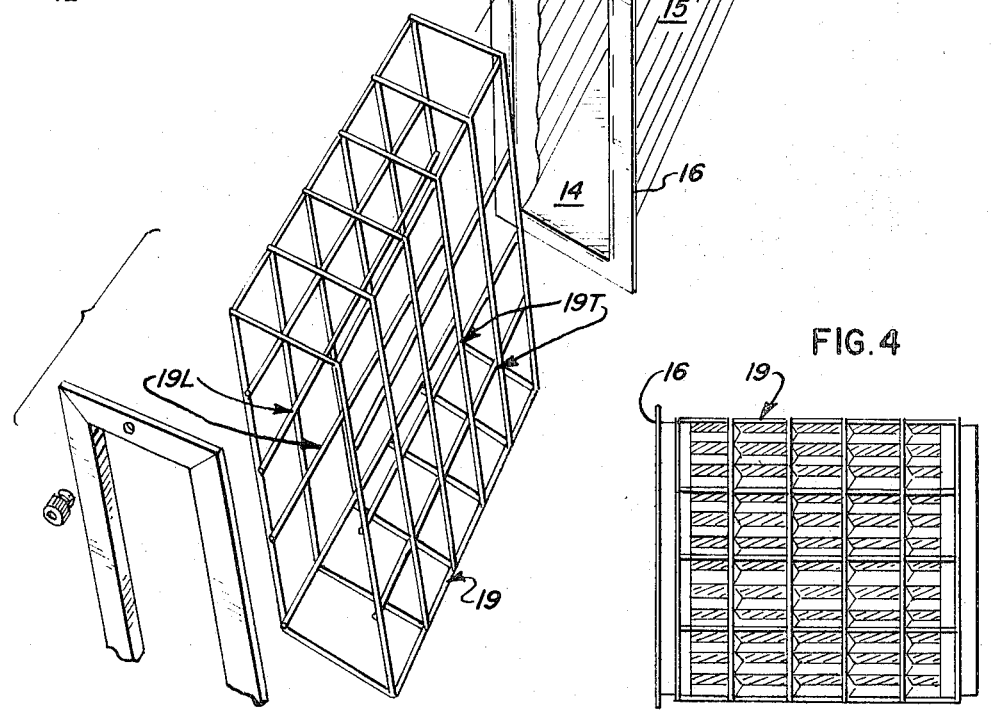

RECTANGULAR FILTER BAG

BACKGROUND OF THE INVENTION

Air intake systems for locomotives utilize a bank of disposable filter cartridges mounted in a rectangular plenum housing. To assure a proper flow of clean air without excessive maintenance, it is important that the filter media be capable of handling micron size particles while operating at high flow rates and low pressure drops. There is a need for disposable filter cartridges satisfying these filtering requirements while being easy to ship and store, easy to install and remove, and resistant to back pressure conditions.

SUMMARY OF THE INVENTION

The present invention provides an improved disposable filter bag of generally rectangular box-shaped extended configuration to mount in existing plenum housings, the bag being of pliable sheet stock of full flow depth filter material to satisfy the filtering requirements and being collapsible for folding the bag into compact form for convenience in shipping and storage.

To stabilize the collapsible bag and maintain maximum operating efficiency, the bag is incorporated in an improved mounting arrangement that includes telescoped external and internal cage-like frames of generally rectangular configuration. These frames are open at both ends and terminate at offset relation to the corresponding ends of the filter.

To facilitate disposal, the reinforced marginal lip that is to serve as a sealing flange for the bag is comprised only of a reverse bend marginal edge portion of the bag sheet stock heat fused upon itself.

In one embodiment the bag has plain side walls. In another embodiment, the bag has side-by-side parallel lines of stitching extending lengthwise in each of its major side walls to define a plurality of collapsible pleats therein to provide a substantial increase in the effective area of exposed filter surface within the same filter mounting space.

To cooperate with the pleated bag configuration the external frame has side grills each including lengthwise spaced, side-by-side extending transverse wires of zig-zag configuration substantially matching the bag pleat configuration.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is an exploded perspective view showing the improved bag mounting arrangement in association with an air intake plenum housing of a locomotive;

FIG. 2 is a fragmentary view illustrating a conventional reinforced bag lip for providing a front seal;

FIG. 3 is a fragmentary exploded view similar to FIG. 1 and showing a pleated bag configuration;

FIG. 4 is a side elevational view showing the assembled relationship of the bag and mounting frames;

FIG. 5 is an enlarged fragmentary section taken on the line 5—5 of FIG. 4; and

FIG. 6 is a view similar to FIG. 2 and showing a modified lip structure to facilitate disposal of the bag.

DESCRIPTION OF PREFERRED EMBODIMENTS

Referring now to the drawings and particularly to FIG. 1, a plenum housing for a locomotive is designated generally at 10 and is shown as including a common inlet wall 11 provided with a plurality of rectangular inlet openings 11I, each bordered by planar marginal wall surfaces that are to be sealed against edge leakage of incoming air.

It is conventional to employ a separate filter bag of generally rectangular mechanically stable configuration mounted in each inlet opening 11I and extending substantially the entire depth of the plenum housing 10. The prior art filter bags have a reinforced marginal lip L (as shown in FIG. 2) comprised of a folded edge portion of the bag material stitched upon a rectangular metal frame F to define a seal flange which is held compressed against the inlet wall 11 of the housing by means of a rectangular retainer frame 12. In the illustrated housing arrangement, mounting studs 11S are located above and below the inlet openings to register with corresponding holes 12H in the retainer frame 12, with knurled nuts 12N being used to clamp the parts together.

The disposable filter bags heretofore used for the intake air of locomotives are of a glass fiber filter media and are constructed to be normally shape-retaining. Each bag is mounted in a separate cage-like framework provided in the plenum housing to assist in retaining the bag shape during normal high speed filtering flow conditions. However, the essentially shape-retaining construction of these bags requires an excessive amount of space during shipping and storage. In addition, the metal reinforcing frame creates unnecessary problems in the disposal of the bags. In spite of the drawbacks associated with the shape-retaining feature of the prior art bags, these bags are also subject to collapse and loss of effective filtering surface upon the occurrence of back pressure conditions in the inlet air filtering system.

An improved disposable filter bag in accordance with this invention is shown generally at 13 in the exploded perspective view of FIG. 1 as having a generally rectangular box-shaped extended configuration, the bag 13 being comprised of pliable sheet stock of full flow depth filter material such as that marketed under the trademark "VISCON-AIRE."

As illustrated, the bag 13 has a pair of minor side walls 14 and a pair of major side walls 15 that define a generally rectangular transverse profile, the side walls 14, 15 leading between the flange-like front sealing lip 16 that defines the open entry mouth of the bag and the closed end wall 17 which is an integral portion of the bag sheet stock.

For the bag sizes used in the present day filter housings for locomotives, (typically 28 ½ inches long, 7 ½ inches wide and 28 ½ inches high), the full flow depth material can handle a flow rate of as great at 2,500 CFM per bag at a pressure drop of 7 inches ($H_2O$). Typical performance parameters for the improved bag are a 98 percent operating efficiency at 8 micron pore size material and a 96 percent operating efficiency at a 5 micron pore size material.

As a further feature of the invention, the bag mounting arrangement retains the stationary external cage-like frame C conventionally provided in the existing filter housings and incorporates a floating internal cage-like frame 19, the frames C, 19 being arranged for mounting in telescoped relation to engage the filter bag 13 in sandwiched relation therebetween.

The external frame C is of open ended generally rectangular configuration and corresponds in size and shape to the transverse profile of the bag side walls 14, 15. The internal frame 19 is also of generally rectangular configuration and consists of a grid work of wires of one eighth inch round metal stock. As illustrated, the transverse grid wires 19T of the internal frame are on the bag side of the frame, whereas lengthwise grid wires 19L are at the interior, thus minimizing any problem of snagging upon insertion of the internal frame into the bag.

In summary, it should be noted that the improved filter bag 13 of the invention has a generally rectangular extended configuration and is collapsible to be folded into compact form for storage and shipping. As shown in FIG. 2, the bag 13 may have a lip L reinforced by a frame L, but it is preferred, as shown in FIG. 6 that the lip L which serves as a seal flange be of a frontal reverse bend configuration wherein the sheet stock is heat fused to itself to impart the planar configuration and rigidity for effecting a snug fit against the inlet wall 11 of the housing while facilitating disposal of the bag. The internal and external frames between which each bag is sandwiched are intended to be reused. During normal operation, the frames C, 19 define and maintain the extended bag configuration and also resist any tendency to collapse in the event back pressure conditions arise in the housing of the air intake system.

Another embodiment, as shown in FIGS. 3 to 5, is mounted in the conventional space available in the existing filter housings for locomotives. The filter bag 13 of FIGS. 3 to 5 is characterized by pleated configurations for the major side walls 15 to achieve about a 25% increase in the effective filtering area of such side walls relative to flat side wall configuration while still enabling collapse of the bag for folding into compact form suitable for shipping and storage.

In the pleated embodiment as illustrated herein, the pleat configurations terminate in about a 3 inch offset relation to each end of the bag.

Each of the major side walls 15 of the bag has side-by-side parallel lines of stitching 15S (see FIG. 5) extending therein and terminating about 3 inches short of each end of the bag to define a plurality of collapsible pleats 15P that present successive inner and outer peaks. As illustrated, each of the peaks is defined by one of the lines of stitching 15S. In particular, these stitching lines are located to produce a pleat height of about 2 ½ inches as illustrated by the arrow labelled A in FIG. 5 and characterized by a peak to peak spacing of about 2 inches as illustrated by the arrow labelled B in FIG. 5

In the pleated embodiment, the bag mounting arrangement includes a stationary external cage-like frame 18 to replace the frame C conventionally provided in the existing filter housings and a floating internal cage-like frame 19, the frames 18, 19 being arranged for mounting in telescoped relation to engage the pleated filter bag 13 in sandwiched relation therebetween.

The external frame 18 is of open ended generally rectangular configuration and corresponds in size and shape to the transverse profile of the bag side walls 14, 15. Thus, the external frame 18 has major side grills each including lengthwise spaced side-by-side extending transverse wires 18T of zig-zag configuration substantially matching the previously described configuration of the pleats.

The internal frame 19 is the same as previously described to minimize any problem of snagging upon insertion of the internal frame into the bag. The zig-zag transverse wires 18T of the external frame are on the bag side and lengthwise wires 18L are on the outside.

While the pleats are closely guided only by the exterior frame in the pleated bag embodiment, the overall arrangement is such that pleat-to-pleat collapse is prevented by the floating internal frame.

Thus, while preferred constructional features of the invention are embodied in the structure illustrated herein, it is to be understood that changes and variations may be made by those skilled in the art without departing from the spirit and scope of the appended claims.

What is claimed is:

1. In an air filter assembly that includes a rectangular plenum housing having an inlet wall provided with a plurality of inlet openings disposed in side-by-side relation, a separate filter bag having a reinforced marginal lip seated in each inlet and defining an open entry mouth, and a separate clamping frame for securing each of said bags with its lip in sealed relation against said inlet wall, an improved filter bag having a generally rectangular box-shaped extended configuration and comprised of pliable sheet stock of full flow depth filter material, said bag having a closed end wall remote from said lip and having major and minor pairs of side walls defining a transverse profile and leading between said lip and said closed end wall, and said walls being collapsible for folding the bag into compact form, said bag also having side-by-side parallel lines of stitching extending lengthwise in each of said major side walls to define a plurality of collapsible pleats having successive inner and outer peaks, each of said peaks having one of said lines of stitching.

2. In an assembly as defined in claim 1 and wherein the mouth defining lip of said bag is comprised only of a reverse bend marginal edge portion of said sheet stock heat fused upon itself to provide a mechanically stable lip of generally rectangular configuration.

3. In an assembly as defined in claim 1 and wherein the peak to peak amplitude of said pleats is sufficiently greater than the peak to peak spacing of said pleats to provide about a 25% increase in the effective filtering area of said bag side walls relative to a flat side wall configuration.

4. In an assembly as defined in claim 1 and wherein each of said lines of stitching terminates in offset relation to the lip end of said bag.

5. In an air filter assembly that includes a rectangular plenum housing having an inlet wall provided with a plurality of inlet openings disposed in side-by-side relation, a separate filter bag having a reinforced marginal lip seated in each inlet and defining an open entry mouth, and a separate clamping frame for securing each of said bags with its lip in sealed relation against said inlet wall, an improved bag mounting arrangement comprising:

a disposable filter bag having a generally rectangular box-shaped extended configuration and comprise of pliable sheet stock of full flow depth filter material, said bag having a closed end wall remote from said lip and having major and minor pairs of sidewalls defining a transverse profile and leading between said lip and said closed end wall and being collapsible for folding the bag into compact form, said bag also having side-by-side parallel lines of stitching extending lengthwise in each of said major side walls to define a plurality of collapsible pleats having successive inner and outer peaks, each of said peaks having one of said lines of stitching, an external cage-like frame of generally rectangular configuration mountable within said plenum housing and corresponding insize and shape to the transverse profile of said bag side walls to receive and stabilize said bag in extended configuration, and an internal cage-like frame of a generally rectangular configuration disposed in snug relation within said bag to resist collapse of said bag from said transverse profile.

6. In an assembly as defined in claim 5 and wherein said external frame has side grills each including lengthwise spaced side-by-side extending transverse wires of zig-zag configuration substantially matching the configuration of said pleats in said major side wall.

7. In an assembly as defined in claim 5 and wherein each of said lines of stitching terminates in offset relation to the lip end of said bag, and said external frame being open at each end and extending substantially coextensive with said pleats.

* * * * *